United States Patent
Eich

(10) Patent No.: US 8,761,798 B2
(45) Date of Patent: Jun. 24, 2014

(54) SYSTEM AND METHOD FOR HOSTING LOCATION BASED SERVICES FOR A MOBILE UNIT OPERATING AMONG A PLURALITY OF MOBILE NETWORKS

(75) Inventor: William J Eich, Wheaton, IL (US)

(73) Assignee: West Corporation, Omaha, NE (US)

( * ) Notice: Subject to any disclaimer, the term of this patent is extended or adjusted under 35 U.S.C. 154(b) by 1114 days.

(21) Appl. No.: 12/273,659

(22) Filed: Nov. 19, 2008

(65) Prior Publication Data
US 2010/0124910 A1    May 20, 2010

(51) Int. Cl.
*H04W 24/00*    (2009.01)

(52) U.S. Cl.
USPC .................. 455/456.3; 455/456.1; 455/456.2; 455/432.1; 455/450; 455/414.3

(58) Field of Classification Search
USPC ............. 455/432.1, 456.1, 456.2, 456.3, 450, 455/414.3; 370/356, 352
See application file for complete search history.

(56) References Cited

U.S. PATENT DOCUMENTS

| | | | |
|---|---|---|---|
| 6,138,003 A * | 10/2000 | Kingdon et al. | 455/410 |
| 7,113,792 B2 | 9/2006 | Glazko et al. | |
| 7,123,928 B2 | 10/2006 | Moeglein et al. | |
| 7,151,939 B2 | 12/2006 | Sheynblat | |
| 7,286,837 B2 | 10/2007 | Giniger et al. | |
| 7,443,339 B2 | 10/2008 | Gaal | |
| 7,450,064 B2 | 11/2008 | Rowitch et al. | |
| 2004/0224702 A1 * | 11/2004 | Chaskar | 455/456.3 |
| 2004/0242209 A1 * | 12/2004 | Kruis et al. | 455/414.1 |
| 2004/0248551 A1 * | 12/2004 | Rowitch et al. | 455/410 |
| 2005/0066044 A1 * | 3/2005 | Chaskar et al. | 709/230 |
| 2007/0173266 A1 * | 7/2007 | Barnes | 455/456.1 |
| 2008/0102858 A1 | 5/2008 | Giniger et al. | |
| 2008/0133762 A1 | 6/2008 | Edge et al. | |
| 2008/0274753 A1 | 11/2008 | Attar et al. | |

* cited by examiner

Primary Examiner — Manpreet Matharu

(57) ABSTRACT

A system for hosting location based services for at least one mobile unit operating among a plurality of mobile networks includes: a location services managing unit coupled with the plurality of mobile networks and with at least one position determination entity. The location services managing unit receives at least one location service request in at least one communication from a respective mobile unit of the at least one mobile unit. The location services managing unit treats a respective location service request of the at least one location service request to ascertain predetermined parameters relating to the respective mobile unit. The location services managing unit employs the predetermined parameters to effect presenting the respective location service request to an appropriate respective position determination entity of the at least one position determination entity for responding to the respective location service request.

20 Claims, 3 Drawing Sheets

SYSTEM AND METHOD FOR HOSTING LOCATION BASED SERVICES FOR A MOBILE UNIT OPERATING AMONG A PLURALITY OF MOBILE NETWORKS

FIELD OF THE INVENTION

The present invention is directed to mobile telecommunication systems, and especially to hosting location based services for at least one mobile unit operating among a plurality of mobile networks.

BACKGROUND

Location Based Services (LBS) permit a mobile unit or Mobile Station (MS) to communicate an inquiry to a Position Determination Entity (PDE) seeking to obtain location information relating to the inquiring MS. LBS are usually a billed service offered by mobile carriers operating mobile networks. A MS may be operating in its Home network operated by its Home carrier, or the MS may be roaming in another mobile network than its Home network that is operated by a Serving carrier. In a hosted PDE environment where the PDE serves several different mobile networks that may be operated by different carriers, the PDE does not (or is unable to) identify the Home and Serving carriers involved in a location request and may service the location request regardless of any agreements between the carriers regardless of whether the MS is authorized to receive LBS. The billing record generated by the PDE may not specifically identify the Home carrier of the subscriber MS, resulting in the wrong carrier being billed for the PDE access. In cases where the PDE does not provide service for the Serving carrier, a roaming subscriber MS may not be able to obtain location based service while roaming.

When a carrier uses Trusted LBS applications, using prior art technology the PDE may service every request received even if the request originates from a MS which has not purchased the LBS service and has fraudulently obtained the Internet Protocol (IP) Address of the PDE. Authorization to receive LBS is important in Trusted as well as Non-trusted LBS applications.

There is a need for a system and method for hosting location based services (LBS) for a mobile station operating among a plurality of mobile networks that can identify a mobile station requesting LBS and verify authorization for a PDE to provide LBS to the identified mobile station.

There is a need for a system and method for hosting location based services (LBS) for a mobile station operating among a plurality of mobile networks that can identify Home and Serving carriers involved in a location request.

SUMMARY

A system for hosting location based services for at least one mobile unit operating among a plurality of mobile networks includes: a location services managing unit coupled with the plurality of mobile networks and with at least one position determination entity. The location services managing unit receives at least one location service request in at least one communication from a respective mobile unit of the at least one mobile unit. The location services managing unit treats a respective location service request of the at least one location service request to ascertain predetermined parameters relating to the respective mobile unit. The location services managing unit employs the predetermined parameters to effect presenting the respective location service request to an appropriate respective position determination entity of the at least one position determination entity for responding to the respective location service request.

A method for hosting location based services for at least one mobile unit operating among a plurality of mobile networks includes: (a) providing a location services managing unit coupled with the plurality of mobile networks and with at least one position determination entity; (b) operating the location services managing unit to receive at least one location service request in at least one communication from a respective mobile unit of the at least one mobile unit; (c) operating the location services managing unit to treat a respective location service request of the at least one location service request to ascertain predetermined parameters relating to the respective mobile unit; and (d) operating the location services managing unit to employ the predetermined parameters to effect presenting the respective location service request to an appropriate respective position determination entity of the at least one position determination entity for responding to the respective location service request.

It is, therefore, a feature of the present invention to provide a system and method for hosting location based services (LBS) for a mobile station operating among a plurality of mobile networks that can identify a mobile station requesting LBS and verify authorization for a PDE to provide LBS to the identified mobile station.

It is another feature of the present invention to provide a system and method for hosting location based services (LBS) for a mobile station operating among a plurality of mobile networks that can identify Home and Serving carriers involved in a location request.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
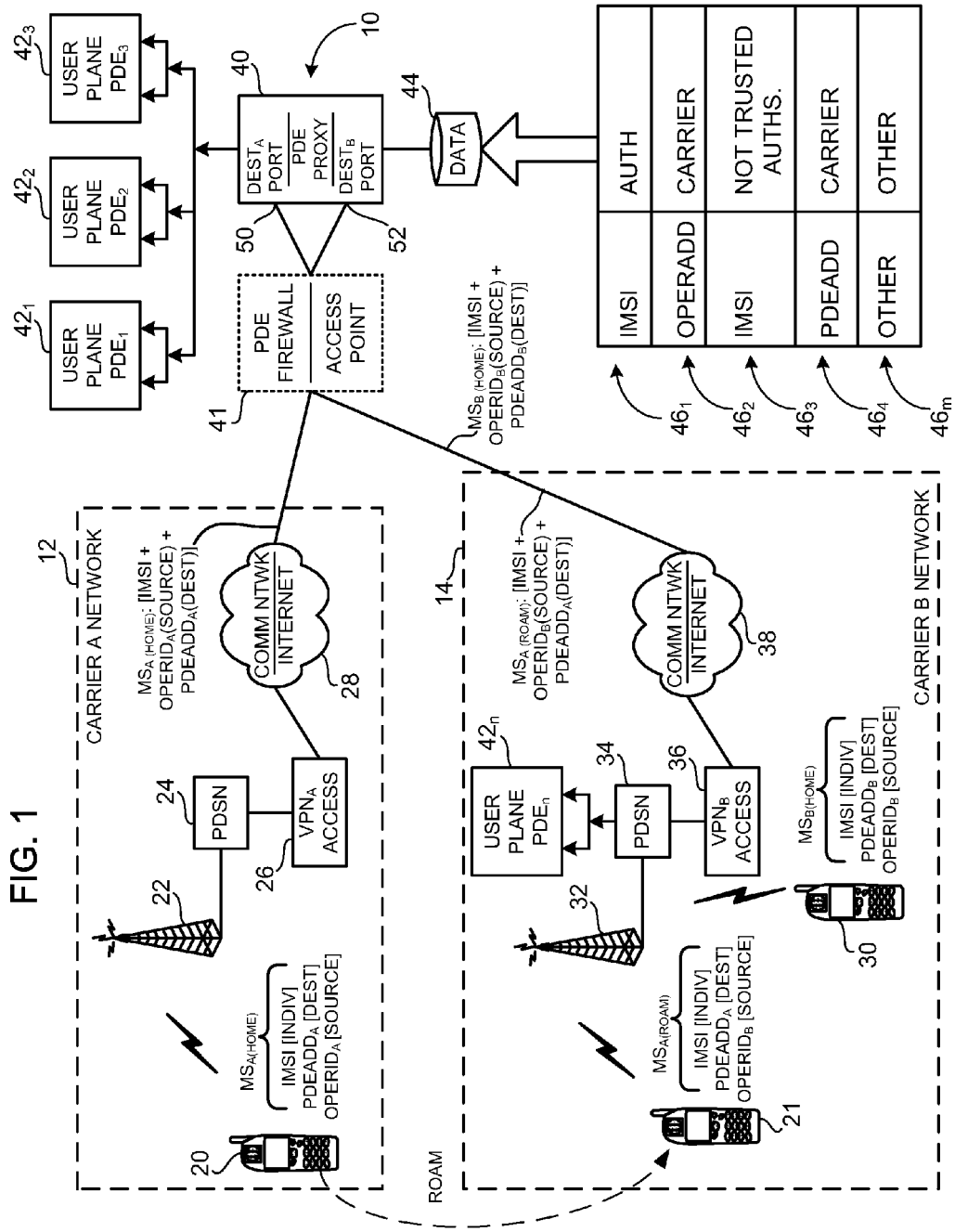
FIG. 1 is a schematic illustration of a system configured according to the teachings of the present invention.

FIG. 1 is a schematic illustration of a system configured according to the teachings of the present invention. In FIG. 1, a system 10 for hosting location based services (LBS) is coupled with a mobile network 12 operated by a Carrier A and is coupled with a mobile network 14 operated by a Carrier B.

Mobile network 12 includes a mobile unit, sometimes referred to as a Mobile Station (MS) 20 in wireless communication with a base station communication tower 22. Communication tower 22 may be coupled with a Packet Data Serving Node (PDSN) 24. PDSN 24 may be coupled with a Virtual Private Network (VPN) Access Unit 26, referred to in FIG. 1 as "$VPN_A$ Access" indicating association with Carrier A. $VPN_A$ Access 26 is coupled with a communication network 28. Communication network 28 may be a private network or another communication network such as, by way of example and not by way of limitation, the Internet.

MS 20 has a plurality of associated identification parameters while operating in its home mobile network 12, referred to as $MS_{A\ (HOME)}$ 20 in FIG. 1. $MS_{A\ (HOME)}$ 20 has an assigned individual identification code such as, by way of example and not by way of limitation, an International Mobile Subscriber Station Identity (IMSI) that is assigned to $MS_{A\ (HOME)}$ 20 when manufactured and is not changed. $MS_{A\ (HOME)}$ 20 also has an assigned Internet Protocol (IP) address for accessing location based services (LBS). This LBS-related IP address is provided to MS units by their respective host carrier when the MS unit subscribes to LBS services and identifies the destination for LBS requests originated by $MS_{A\ (HOME)}$ 20. In FIG. 1, the LBS-related IP address for $MS_{A\ (HOME)}$ 20 is indicated as $PDEADD_A$. $MS_{A\ (HOME)}$ 20 also has a Transmission Control Protocol/Internet Protocol (TCP/IP) address assigned, indicated as $OPERID_A$ in FIG. 1. A TCP/IP address enables communication across interconnected networks using a high-speed networking protocol that is valued for its ability to interconnect various computer platforms flexibly and cost-effectively.

A LBS request communication (also referred to as a LBS request or a LBS service request) may be transmitted by $MS_{A\ (HOME)}$ 20 wirelessly to communication tower 22. The LBS request communication is then passed to PDSN 24 and further transferred to $VPN_A$ Access 26. $VPN_A$ Access 26 forwards the LBS request communication via communication network 28 for further treatment, as will be described below. Somewhere between $MS_{A\ (HOME)}$ 20 and communication network 28 the LBS request communication is formatted to include certain predetermined parameters. The predetermined parameters may be included, by way of example and not by way of limitation, in a packet header associated with the LBS request communication. The predetermined parameters may include, by way of further example and not by way of limitation, IMSI, $PDEADD_A$ and $OPERID_A$. Including the IMSI in the LBS request communication permits the associated LBS request communication to be identified as having been originated by $MS_{A\ (HOME)}$ 20. Including the $PDEADD_A$ in the LBS request communication permits the associated LBS request communication to be identified as having been originated from a mobile station having Carrier A as its Home network. Including the $OPERID_A$ in the LBS request communication permits the associated LBS request communication to be identified as having been originated from a mobile station having Carrier A as its Serving network.

Mobile network 14 includes a mobile unit, sometimes referred to as a Mobile Station (MS) 30 in wireless communication with a base station communication tower 32. Communication tower 32 may be coupled with a Packet Data Serving Node (PDSN) 34. PDSN 34 may be coupled with a Virtual Private Network (VPN) Access Unit 36, referred to in FIG. 1 as "$VPN_B$ Access" indicating association with Carrier B. $VPN_B$ Access 36 is coupled with a communication network 38. Communication network 38 may be a private network or another communication network such as, by way of example and not by way of limitation, the Internet.

MS 30 has a plurality of associated identification parameters while operating in its home mobile network 14, referred to as $MS_{B\ (HOME)}$ 30 in FIG. 1. $MS_{B\ (HOME)}$ 30 has an assigned individual identification code such as, by way of example and not by way of limitation, an International Mobile Subscriber Station Identity (IMSI) that is assigned to $MS_{B\ (HOME)}$ 30 when manufactured and is not changed. $MS_{B\ (HOME)}$ 30 also has an assigned Internet Protocol (IP) address for accessing location based services (LBS). This LBS-related IP address is provided to MS units by their respective host carrier when the MS unit subscribes to LBS services and identifies the destination for LBS requests originated by $MS_{B\ (HOME)}$ 30. In FIG. 1, the LBS-related IP address for $MS_{B\ (HOME)}$ 30 is indicated as $PDEADD_B$. $MS_{B\ (HOME)}$ 30 also has a Transmission Control Protocol/Internet Protocol (TCP/IP) address assigned, indicated in FIG. 1 as $OPERID_B$ in FIG. 1.

LBS request communications may be transmitted by $MS_{B\ (HOME)}$ 30 wirelessly to communication tower 32. The LBS request communication is then passed to PDSN 34 and further transferred to $VPN_B$ Access 36. $VPN_B$ Access 36 forwards the LBS request communication via communication network 38 for further treatment, as will be described below. Somewhere between $MS_{B\ (HOME)}$ 30 and communication network 38 the LBS request communication is formatted to include certain predetermined parameters. The predetermined parameters may be included, by way of example and not by way of limitation, in a packet header associated with the LBS request communication. The predetermined parameters may include, by way of further example and not by way of limitation, IMSI, $PDEADD_B$ and $OPERID_B$. Including the IMSI in the LBS request communication permits the associated LBS request communication to be identified as having been originated by $MS_{B\ (HOME)}$ 30. Including the $PDEADD_B$ in the LBS request communication permits the associated LBS request communication to be identified as having been originated from a mobile station having Carrier B as its Home network. Including the $OPERID_B$ in the LBS request communication permits the associated LBS request communication to be identified as having been originated from a mobile station having Carrier B as its Serving network.

$MS_{A\ (HOME)}$ 20 may travel sufficiently that $MS_{A\ (HOME)}$ 20 operates in connection with Carrier B using network 14. This situation is referred to as "roaming". When roaming, $MS_{A\ (HOME)}$ 20 may be referred to as $MS_{A\ (ROAM)}$ 21, as indicated in FIG. 1. $MS_{A\ (ROAM)}$ 21 has a plurality of associated identification parameters while operating in its serving mobile network 14. $MS_{A\ (ROAM)}$ 21 retains its assigned IMSI unchanged. $MS_{A\ (ROAM)}$ 21 also retains its assigned IP address $PDEADD_A$ for accessing LBS unchanged. $MS_{A\ (ROAM)}$ 21 has a newly assigned TCP/IP, indicated in FIG. 1 as $OPERID_B$ in FIG. 1.

LBS request communications may be transmitted by $MS_{A\ (ROAM)}$ 21 wirelessly to communication tower 32. The LBS request communication is then passed to PDSN 34 and further transferred to $VPN_B$ Access 36. $VPN_B$ Access 36 forwards the LBS request communication via communication network 38 for further treatment, as will be described below. Somewhere between $MS_{A\ (ROAM)}$ 21 and communication network 38 the LBS request communication is formatted to include predetermined parameters, by way of example and not by way of limitation, in a packet header associated with the LBS request communication. The predetermined parameters may include, by way of further example and not by way of limitation, IMSI, PDEADD$_A$ and OPERID$_B$. Including the IMSI in the LBS request communication permits the associated LBS request communication to be identified as having been originated by MS$_{A\ (ROAM)}$ 21. Including the PDEADD$_A$ in the LBS request communication permits the associated LBS request communication to be identified as having been originated from a mobile station having Carrier A as its Home network. Including the OPERID$_B$ in the LBS request communication permits the associated LBS request communication to be identified as having been originated from a mobile station having Carrier B as its Serving network.

System 10 includes a location services management unit 40 coupled with networks 12, 14 via communication networks 28, 38. Location services managing unit 40 is embodied in the representative system illustrated in FIG. 1 in a PDE Proxy unit 40. A PDE firewall unit—Access Point 41 may be coupled between communication networks 28, 38 and PDE Proxy unit 40, if desired. The optional nature of including PDE firewall unit—Access Point 41 coupled between communication networks 28, 38 and PDE Proxy unit 40 is indicated by using a dotted line format for indicating PDE firewall unit—Access Point 41 in FIG. 1.

PDE Proxy unit 40 is coupled with at least one Position Determination Entity (PDE) 42$_1$, 42$_2$, 42$_3$, 42$_n$ (PDE 42$_n$ is included in network 14). PDE Proxy unit 40 may route LBS request communications to any PDE 42$_n$ using routing techniques known to those skilled in the art of telecommunication system design. The indicator "n" is employed to signify that there can be any number of PDEs in system 10. The inclusion of four PDEs 42$_1$, 42$_2$, 42$_3$, 42$_n$ in FIG. 1 is illustrative only and does not constitute any limitation regarding the number of PDEs that may be included in the system of the present invention.

System 10 may also include a data store 44 coupled with PDE Proxy unit 40. Data store 44 may store information such as authorizations by IMSI, as indicated at representative data record 46$_1$. TCP/IP addresses are sometimes assigned to respective Carriers in blocks so that a range of TCP/IP addresses may include an assigned block identifying a respective Carrier. Data store 44 may store information such as ranges of TCP/IP addresses by Carrier, as indicated at representative data record 46$_2$. Data store 44 may store information such as authorizations for non-trusted or trusted access to a PDE by IMSI, as indicated at representative data record 46$_3$. Data store 44 may store LBS access IP addresses employed by respective carriers, as indicated at representative data record 46$_4$. Data store 44 may store other information as indicated at representative data record 46$_m$. The indicator "m" is employed to signify that there can be any number of data records in data store 44. The inclusion of five representative data records 46$_1$, 46$_2$, 46$_3$, 46$_4$, 46$_m$ in FIG. 1 is illustrative only and does not constitute any limitation regarding the number of representative data records or data record types that may be included in the data store of the present invention.

PDE Proxy 40 is preferably configured to process received LBS access IP addresses PDEADD$_A$, PDEADD$_B$ at different ports or to otherwise distinguish between LBS access IP addresses PDEADD$_A$, PDEADD$_B$. In the representative embodiment of system 10 illustrated in FIG. 1, PDE Proxy unit 40 receives LBS requests addressed to PDEADD$_A$ at a destination port 50 and receives LBS requests addressed to PDEADD$_B$ at a destination port 52. Routing to destination ports 50, 52 may be carried out by PDE firewall unit—Access Point 41, by PDE Proxy unit 40 or by another network element (not shown in FIG. 1) between a respective MS and PDE Proxy unit 40 as will be understood by one skilled in the art of telecommunication system design.

When PDE Proxy unit 40 receives a LBS request communication from MS$_{A\ (HOME)}$ 20 the communication will include predetermined parameters [e.g., IMSI+OPERID$_A$+PDEADD$_A$]. The parameter IMSI will identify MS$_{A\ (HOME)}$ 20 as a particular respective Mobile Station (MS). The parameter OPERID$_A$ will identify the extant LBS request communication as having originated from a MS operating in a Serving network operated by Carrier A. The parameter PDEADD$_A$ will identify the extant LBS request communication as having originated from a MS having a Home network operated by Carrier A and seeking to have the LBS request communication delivered to destination port 50.

When PDE Proxy unit 40 receives a LBS request communication from MS$_{B\ (HOME)}$ 30 the communication will include predetermined parameters [e.g., IMSI+OPERID$_B$+PDEADD$_B$]. The parameter IMSI will identify MS$_{B\ (HOME)}$ 30 as a particular respective Mobile Station (MS). The parameter OPERID$_B$ will identify the extant LBS request communication as having originated from a MS operating in a Serving network operated by Carrier B. The parameter PDEADD$_B$ will identify the extant LBS request communication as having originated from a MS having a Home network operated by Carrier B and seeking to have the LBS request communication delivered to destination port 52.

When PDE Proxy unit 40 receives a LBS request communication from MS$_{A\ (ROAM)}$ 21 the communication will include predetermined parameters [e.g., IMSI+OPERID$_B$+PDEADD$_A$]. The parameter IMSI will identify MS$_{A\ (ROAM)}$ 21 as a particular respective Mobile Station (MS). The parameter OPERID$_B$ will identify the extant LBS request communication as having originated from a MS operating in a Serving network operated by Carrier B. The parameter PDEADD$_A$ will identify the extant LBS request communication as having originated from a MS having a Home network operated by Carrier A and seeking to have the LBS request communication delivered to destination port 50.

PDE Proxy unit 40 thereby is apprised of the identification (IMSI) of a respective MS placing a LBS Request communication. Using information stored in records 46$_1$ in data store 44, PDE Proxy unit 40 can use the IMSI information to assure the calling MS is authorized for accessing a PDE for location information. Using information stored in records 46$_3$ in data store 44, PDE Proxy unit 40 can use the IMSI information to assure the calling MS is authorized for non-trusted or trusted access to a PDE for location information (discussed further below in connection with FIG. 2). Using information stored in records 46$_2$ in data store 44, PDE Proxy unit 40 can use TCP/IP Address information (OPERADD) to determine the Serving network of the MS placing a LBS request communication. Using information stored in records 46$_4$ in data store 44, PDE Proxy unit 40 can use LBS access IP address information (PDEADD) to determine the Home network of the MS placing a LBS request communication.

Knowing identification of a respective individual MS, the Home network of that respective MS and the Serving network of the respective MS permits determination of authorization of the respective MS for using LBS services; permits preparing billing reports or statements that reflect individual MS identification, Home network and Serving network involved in the LBS service request; permits identification of the two networks involved in the billing event (i.e., LBS service request) so that roaming agreements between the two involved carriers may be identified, verified and enforced;

and permits routing of the LBS service request to the proper serving PDE $42_n$ for the respective MS involved in the LBS service request. The determination, preparing, identifying, verifying, enforcing, routing and other uses of the predetermined parameters conveyed with the LBS service request may be carried out by PDE Proxy unit 40 or by one or more other units (not shown in FIG. 1) as will be understood by those skilled in the art of telecommunication system design.

Throughout this description, use of a reference numeral using a generic subscript herein may be taken to mean that any respective member of the plurality of elements having the same reference numeral may be regarded as included in the description. Thus, by way of example and not by way of limitation, referring to PDE $42_n$ in describing FIG. 1 may be taken to mean that any PDE—$42_1$, $42_2$, $42_3$, or $42_n$ (FIG. 1)—may be regarded as capable of employment as described.

A Mobile Station (MS) configured for communicating non-trusted LBS requests may be provided an IP address for a Mobile Positioning Center (MPC) rather than being provided with an IP address for a Position Determination Entity (PDE). No MPC is illustrated n FIG. 1. The concept and operation of a MPC are understood by those skilled in the art of telecommunication system design. In such a non-trusted LBS environment, the MS desiring to convey a LBS request first communicates an authorization request to the MPC. The MS is identified by its respective IMSI. The MPC may return an authorization to the MS along with an IP address to a non-trusted port of the appropriate PDE. The MPC will substantially contemporaneously notify the appropriate PDE of the authorized request. The MS then communicates the LBS service request to the non-trusted port on the appropriate PDE. Having received authorization from the MPC, the PDE permits the MS to obtain location information. The interface between the MPC and the PDE is a specialized interface. One version of the specialized interface is known in the industry as the "E5' interface".

Network-initiated location requests such as, by way of example and not by way of limitation, Emergency 9-1-1 network location requests, child finder location requests and buddy finder location requests are treated as non-trusted LBS requests and, therefore, require installation of the specialized interface between the MPC and a PDE.

The present invention may effect non-trusted LBS applications without having to employ the specialized interface between the MPC and a PDE.

Figure 2:
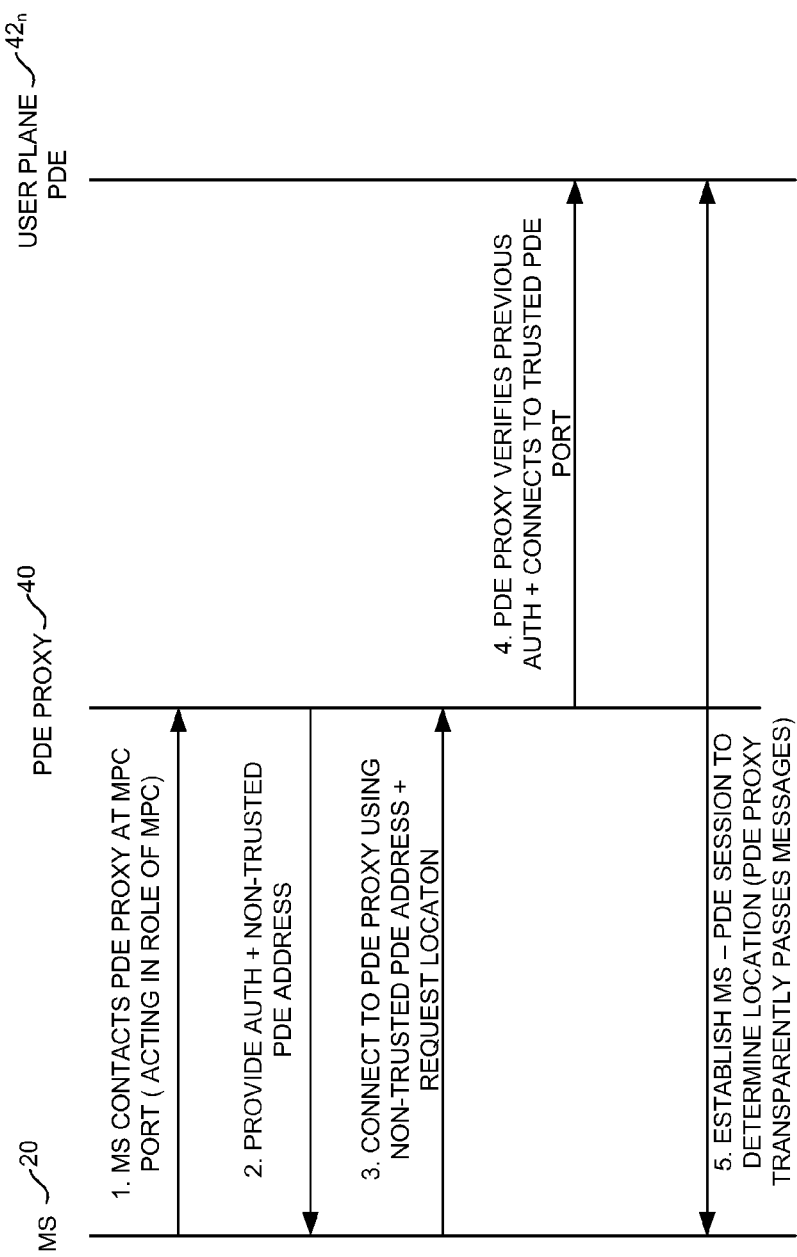
FIG. 2 is a schematic diagram illustrating call flow supporting non-trusted location based services and network-initiated location requests according to the teachings of the present invention.

FIG. 2 is a schematic diagram illustrating call flow supporting non-trusted location based services and network-initiated location requests according to the teachings of the present invention. In FIG. 2, a non-trusted LBS request communication is initiated (Call #1) by a Mobile Station (MS), such as by way of example and not by way of limitation $MS_{A\ (HOME)}$ 20. $MS_{A\ (HOME)}$ 20 contacts PDE Proxy unit 40 (acting in the role of MPC) at a port identified as an MPC port. Alternatively, the Home carrier of $MS_{A\ (HOME)}$ 20 may provide $MS_{A\ (HOME)}$ 20 with a port of PDE Proxy unit 40 for non-trusted LBS communications.

PDE Proxy unit 40 inquires of Data Store 44 whether $MS_{A\ (HOME)}$ 20 (identified by IMSI) is authorized for non-trusted LBS request communications (e.g., at a respective record $46_3$; FIG. 1). Authorization may be provided by a respective carrier according to rules established and enforced by the respective carrier. PDE Proxy unit 40 provides (Call #2) authorization (if appropriate) plus a non-trusted IP address to be used for the specific location request. Although it is entirely up to a respective PDE $42_n$ how long the authorization remains in effect, there is commonly a timeframe within which the location request must be received at PDE $42_n$. After that timeframe elapses (typically less than 10-20 seconds) the authorization expires and the location request is rejected.

$MS_{A\ (HOME)}$ 20 then places a LBS service request. It is preferable that $MS_{A\ (HOME)}$ 20 send a LBS request to PDE $42_n$ substantially immediately upon receiving authorization from PDE Proxy 40. $MS_{A\ (HOME)}$ 20 cannot cache an authorization to use at will. As mentioned earlier herein, an authorization is only good for a short period of time and for a single location request. $MS_{A\ (HOME)}$ 20 communicates (Call #3) with PDE Proxy unit 40 via the non-trusted port (IP address provided in Call #2) to request location service. PDE Proxy unit 40 verifies that the calling MS has been previously authorized for non-trusted LBS service and connects (Call #4) with a trusted port at an appropriate PDE $42_n$. Verifying that the calling MS has been previously authorized for non-trusted LBS service may involve an inquiry to data store 44. Messages for implementing an LBS location service session (Call #5) are transparently passed between $MS_{A\ (HOME)}$ 20 and PDE $42_n$. In this non-trusted LBS operation, PDE $42_n$ performs no authorization check on the trusted port. PDE Proxy unit 40 preferably reviews or "sniffs" each message as it passes through (during Call #5) to ensure proper communications.

Network-initiated location requests such as, by way of example and not by way of limitation, Emergency 9-1-1 network location requests, child finder location requests and buddy finder location requests may be accommodated as non-trusted LBS requests substantially as described above in connection with other non-trusted LBS request originating entities.

Figure 3:
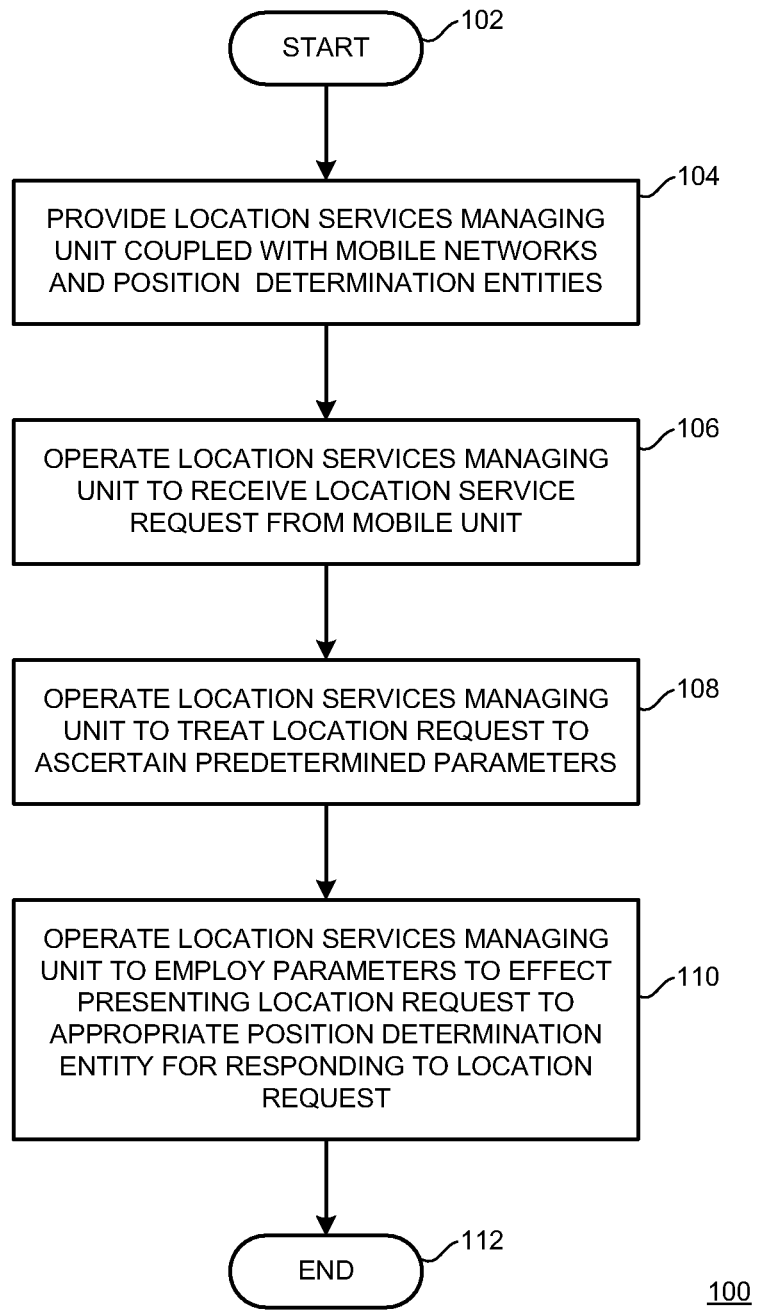
FIG. 3 is a flow diagram illustrating the method of the present invention.

FIG. 3 is a flow diagram illustrating the method of the present invention. In FIG. 3, a method 100 for hosting location based services for at least one mobile unit operating among a plurality of mobile networks begins at a START locus 102. Method 100 continues with providing a location services managing unit coupled with the plurality of mobile networks and with at least one position determination entity, as indicated by a block 104.

Method 100 continues with operating the location services managing unit to receive at least one location service request in at least one communication from a respective mobile unit of the at least one mobile unit, as indicated by a block 106.

Method 100 continues with operating the location services managing unit to treat a respective location service request of the at least one location service request to ascertain predetermined parameters relating to the respective mobile unit, as indicated by a block 108.

Method 100 continues with operating the location services managing unit to employ the predetermined parameters to effect presenting the respective location service request to an appropriate respective position determination entity of the at least one position determination entity for responding to the respective location service request, as indicated by a block 110. Method 100 terminates at an END locus 112.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for hosting location based services for at least one mobile unit operating among a plurality of mobile networks; the system comprising: a location services managing unit coupled with said plurality of mobile networks and with at least one position determination entity wherein said hosting location based services is provided to several different mobile networks that may be operated by different carriers; said location services managing unit receiving at least one location based service request in at least one communication from a respective requesting mobile unit of said at least one mobile unit; said location services managing unit treating a respective location based service request of said at least one location based service request to ascertain predetermined parameters relating to said respective requesting mobile unit; said predetermined parameters being uniquely assigned to said respective requesting mobile unit; and said location services managing unit employing only said predetermined parameters to identify said respective requesting mobile unit and to effect presenting said respective location based service request to an appropriate respective position determination entity of said at least one position determination entity for responding to said respective location based service request.

2. A system for hosting location based services for at least one mobile unit operating among a plurality of mobile networks as recited in claim 1 wherein the system further comprises a data store coupled with said location services managing unit; said data store including data relating to authorizing a respective said mobile unit for accessing a respective said position determination entity; said location services managing unit inquiring of said data store to assure said respective requesting mobile unit is authorized for accessing said respective position determination entity before effecting said presenting.

3. A system for hosting location based services for at least one mobile unit operating among a plurality of mobile networks as recited in claim 2 wherein said predetermined parameters are stored in said data store.

4. A system for hosting location based services for at least one mobile unit operating among a plurality of mobile networks as recited in claim 1 wherein said predetermined parameters identify home network and service network of said respective requesting mobile unit among said plurality of mobile networks.

5. A system for hosting location based services for at least one mobile unit operating among a plurality of mobile networks as recited in claim 2 wherein said predetermined parameters identify home network and service network of said respective requesting mobile unit among said plurality of mobile networks.

6. A system for hosting location based services for at least one mobile unit operating among a plurality of mobile networks as recited in claim 1 wherein communications between said respective requesting mobile unit and said appropriate respective position determination unit are carried out via said location services managing unit.

7. A system for hosting location based services for at least one mobile unit operating among a plurality of mobile networks as recited in claim 3 wherein said predetermined parameters identify home network and service network of said respective requesting mobile unit among said plurality of mobile networks.

8. A system for hosting location based services for at least one mobile unit operating among a plurality of mobile networks as recited in claim 7 wherein communications between said respective requesting mobile unit and said appropriate respective position determination unit are carried out via said location services managing unit.

9. A system for hosting location based services for a plurality of mobile units operating among a plurality of mobile networks; the system comprising: at least one location services managing unit coupled with said plurality of mobile networks wherein said hosting location based services is provided to several different mobile networks that may be operated by different carriers; each respective location services managing unit of said at least one location services managing unit being coupled with at least one position determination entity; each said respective location services managing unit receiving at least one location based service request in at least one communication from a respective requesting mobile unit of said plurality of mobile units; each respective location based service request of said at least one location based service request being presented in a predetermined format containing a plurality of predetermined parameters; said plurality of predetermined parameters being uniquely assigned to said respective requesting mobile unit; and said respective location services managing unit parsing only said predetermined parameters to identify said respective requesting mobile unit and to effect presenting said respective location based service request to an appropriate respective position determination entity of said at least one position determination entity for responding to said respective location based service request.

10. A system for hosting location based services for a plurality of mobile units operating among a plurality of mobile networks as recited in claim 9 wherein the system further comprises a data store coupled with said location services managing unit; said data store including data relating to authorizing a respective said mobile unit for accessing a respective said position determination entity; said location services managing unit inquiring of said data store to assure said respective requesting mobile unit is authorized for accessing said respective position determination entity before effecting said presenting.

11. A system for hosting location based services for a plurality of mobile units operating among a plurality of mobile networks as recited in claim 10 wherein said predetermined parameters are stored in said data store.

12. A system for hosting location based services for a plurality of mobile units operating among a plurality of mobile networks as recited in claim 9 wherein said predetermined parameters identify home network and service network of said respective requesting mobile unit among said plurality of mobile networks.

13. A system for hosting location based services for a plurality of mobile units operating among a plurality of mobile networks as recited in claim 10 wherein said predetermined parameters identify home network and service network of said respective requesting mobile unit among said plurality of mobile networks.

14. A system for hosting location based services for a plurality of mobile units operating among a plurality of mobile networks as recited in claim 10 wherein communications between said respective requesting mobile unit and said appropriate respective position determination unit are carried out via said respective location services managing unit.

15. A system for hosting location based services for a plurality of mobile units operating among a plurality of mobile networks as recited in claim 11 wherein said predetermined parameters identify home network and service network of said respective requesting mobile unit among said plurality of mobile networks.

16. A system for hosting location based services for a plurality of mobile units operating among a plurality of mobile networks as recited in claim 15 wherein communications between said respective requesting mobile unit and said appropriate respective position determination unit are carried out via said respective location services managing unit.

17. A method for hosting location based services for at least one mobile unit operating among a plurality of mobile networks; the method comprising:
  (a) providing a location services managing unit coupled with said plurality of mobile networks and with at least one position determination entity wherein said hosting location based services is provided to several different mobile networks that may be operated by different carriers;
  (b) operating said location services managing unit to receive at least one location based service request in at least one communication from a respective requesting mobile unit of said at least one mobile unit;
  (c) operating said location services managing unit to treat a respective location based service request of said at least one location based service request to ascertain predetermined parameters relating to said respective requesting mobile unit; said predetermined parameters being uniquely assigned to said respective requesting mobile unit; and
  (d) operating said location services managing unit to employ only said predetermined parameters to identify said respective requesting mobile unit and to effect presenting said respective location based service request to an appropriate respective position determination entity of said at least one position determination entity for responding to said respective location based service request.

18. A method for hosting location based services for at least one mobile unit operating among a plurality of mobile networks as recited in claim 17 wherein the method further comprises:
  (e) providing a data store coupled with said location services managing unit; said data store including data relating to authorizing a respective said mobile unit for accessing a respective said position determination entity; and
  (f) operating said location services managing unit to inquire of said data store to assure said respective requesting mobile unit is authorized for accessing said respective position determination entity before effecting said presenting.

19. A method for hosting location based services for at least one mobile unit operating among a plurality of mobile networks as recited in claim 18 wherein said predetermined parameters are stored in said data store.

20. A method for hosting location based services for at least one mobile unit operating among a plurality of mobile networks as recited in claim 19 wherein said predetermined parameters identify home network and service network of said respective requesting mobile unit among said plurality of mobile networks, and wherein said predetermined parameters identify a respective serving position determination entity for said respective requesting mobile unit.

* * * * *